(12) United States Patent
Rozenburg et al.

(10) Patent No.: US 11,667,579 B2
(45) Date of Patent: Jun. 6, 2023

(54) POLYCRYSTALLINE CHALCOGENIDE CERAMIC MATERIAL

(71) Applicant: Schott Corporation, Elmsford, NY (US)

(72) Inventors: Keith Gregory Rozenburg, Factoryville, PA (US); Eric Hector Urruti, Duryea, PA (US)

(73) Assignee: Schott Corporation, Elmsford, NY (US)

( * ) Notice: Subject to any disclaimer, the term of this patent is extended or adjusted under 35 U.S.C. 154(b) by 575 days.

(21) Appl. No.: 16/273,738

(22) Filed: Feb. 12, 2019

(65) Prior Publication Data

US 2019/0185383 A1 Jun. 20, 2019

Related U.S. Application Data

(62) Division of application No. 14/958,360, filed on Dec. 3, 2015, now Pat. No. 10,246,377, which is a division
(Continued)

(51) Int. Cl.
*C04B 35/547* (2006.01)
*G02B 1/02* (2006.01)
(Continued)

(52) U.S. Cl.
CPC ........ *C04B 35/6455* (2013.01); *C04B 35/547* (2013.01); *C04B 35/638* (2013.01);
(Continued)

(58) Field of Classification Search
CPC .................................................. C04B 35/547
See application file for complete search history.

(56) References Cited

U.S. PATENT DOCUMENTS

| | | |
|---|---|---|
| 3,131,025 A | 4/1964 | Carnall, Jr. et al. |
| 3,131,026 A | 4/1964 | Carnall, Jr. et al. |

(Continued)

FOREIGN PATENT DOCUMENTS

| | | |
|---|---|---|
| EP | 0157040 A2 | 10/1985 |
| EP | 0678760 A1 | 10/1995 |

(Continued)

OTHER PUBLICATIONS

Machine translation of JP2008127236 (Year: 2008).*
(Continued)

*Primary Examiner* — Karl E Group
(74) *Attorney, Agent, or Firm* — Millen White Zelano & Branigan, PC; Brion P. Heaney

(57) ABSTRACT

The invention relates to a polycrystalline IR transparent material produced by sintering chalcogenide powder, e.g., ZnS powder, using hot uniaxial pressing followed by hot isostatic pressing. The microstructure of the material described in this disclosure is much finer than that found in material produced using the state of the art process. By using a powder with a particle size fine enough to improve sintering behavior but coarse enough to prevent a lowering of the wurtzite-sphalerite transition temperature, a highly transparent material with improved strength is created without degrading the optical properties. A high degree of transparency is achieved during hot pressing by applying pressure after the part has reached a desired temperature. This allows some degree of plastic deformation and prevents rapid grain growth which can entrap porosity. The crystallographic twins created during this process further inhibit grain growth during hot isostatic pressing.

17 Claims, 4 Drawing Sheets

Related U.S. Application Data of application No. 13/447,921, filed on Apr. 16, 2012, now abandoned.

(51) Int. Cl.
```
C04B 35/645      (2006.01)
C04B 35/638      (2006.01)
H04N 5/33        (2023.01)
```

(52) U.S. Cl.
CPC ........ *G02B 1/02* (2013.01); *C04B 2235/3284* (2013.01); *C04B 2235/446* (2013.01); *C04B 2235/5436* (2013.01); *C04B 2235/5445* (2013.01); *C04B 2235/656* (2013.01); *C04B 2235/6562* (2013.01); *C04B 2235/6567* (2013.01); *C04B 2235/6581* (2013.01); *C04B 2235/762* (2013.01); *C04B 2235/786* (2013.01); *C04B 2235/96* (2013.01); *C04B 2235/9607* (2013.01); *C04B 2235/9646* (2013.01); *C04B 2235/9653* (2013.01); *H04N 5/33* (2013.01)

(56) References Cited

U.S. PATENT DOCUMENTS

| | | | |
|---|---|---|---|
| 3,131,238 | A | 4/1964 | Carnall, Jr. et al. |
| 3,454,685 | A | 7/1969 | Roy et al. |
| 4,366,141 | A | 12/1982 | Martin et al. |
| 4,944,900 | A | 7/1990 | Willingham et al. |
| 5,001,093 | A | 3/1991 | Roy et al. |
| 5,126,081 | A | 6/1992 | Willingham et al. |
| 5,383,969 | A | 1/1995 | Teverovsky et al. |
| 5,425,983 | A | 6/1995 | Peterson |
| 5,575,959 | A | 11/1996 | Harris et al. |
| 5,643,505 | A | 7/1997 | Harris et al. |
| 6,111,689 | A | 8/2000 | Shibata |
| 6,863,842 | B2 | 3/2005 | Hasegawa |
| 7,790,072 | B2 | 9/2010 | Korenstein et al. |
| 7,790,137 | B2 | 9/2010 | Xiao et al. |
| 8,803,088 | B1 | 8/2014 | Ravichandran et al. |
| 2010/0154256 | A1 | 6/2010 | Dua |
| 2011/0315808 | A1 | 12/2011 | Zelinski et al. |
| 2014/0203461 | A1 | 7/2014 | Devan |

FOREIGN PATENT DOCUMENTS

| | | | |
|---|---|---|---|
| EP | 0872571 | A1 | 10/1998 |
| EP | 0950904 | B1 | 7/2006 |
| JP | 61205659 | A | 9/1986 |
| JP | 3271122 | A | 12/1991 |
| JP | 5310467 | A | 11/1993 |
| JP | 8034639 | A | 2/1996 |
| JP | 8271701 | A | 10/1996 |
| JP | 11295501 | A | 10/1999 |
| JP | 2008127236 | A * | 6/2008 |
| JP | 2008127236 | A | 6/2008 |
| JP | 2008195593 | A | 8/2008 |
| JP | 2010237029 | A | 10/2010 |
| WO | 05062394 | A1 | 7/2005 |

OTHER PUBLICATIONS

Examination report in corresponding EP Application No/13795886.4 dated Apr. 15, 2020 (1-4).

Examination report in corresponding IN Application No. 8180/DELNP/2014 dated Jan. 7, 2020 (1-6).

Chen et al. "Characterization of Pore Size Distribution by Infrared Scattering in Highly Dense Zns" j. Am. Ceram. Soc. 76[8](1995) pp. 2086-2092.

Machine Translation of Jp 2008127236, Sato et al, Jun. 2008.

Zin Sulfide Wikipedia, No Date.

Reddy et al: The Infrared Transmission Performance of Hot Isostatically Pressed Zinc Sulphide International Journal of Powder Metallurgy / APMI International, American Powder Metallurgy Institute, US, vol. 31, No. 3, Jul. 1, 1995 (Jul. 1, 1995), pp. 265-269, XP008166515, ISSN 0888-7462.

("Sphalerite". [online] [retrieved Feb. 4, 2011]. Retrieved From the Internet: Http://en.wikipedia.org/wiki/sphalerite Via Http://archive.org/web/.

W.W. Chen et al., "Solid-State Phase Equilibria in the ZnS—CdS System," Mat. Res. Bult., vol. 23, pp. 1667-1673 (1988).

J.J. Couderc et al., "The Interaction between Slip and Twinning Systems in Natural Sphalerite Experimentally Deformed," Phys. Stat. Sol. (a) 90, pp. 581-593 (1985).

A. Farwer et al., "Unnere Optische Reflexionen au Kubischen ZnS mit Eindimensionaler Lagefehlordnung," Phys. Stat. Sol. 28, pp. 373-383 (1968).

B. Gilbert et al., "Surface Chemistry Controls Crystallinity of ZnS Nanoparticles," Lawrence Berkeley National Laboratory, pp. 10-18, Dec. 20, 2005.

B. Gilbert et al., "Analysis and Simulation of the Structure of Nanoparticles that Undergo a Surface-Driven Structural Transformation," J. of Chemical Physics, vol. 120, No. 24, pp. 11785-11795 (Jun. 22, 2004).

C. Levade et al., "Plastic Deformation of Natural Sphalerite Single Crystals between 300 and 620 K," Phys. Stat. Sol. (a) 112, pp. 89-97 (1989).

J.S. McCloy, "Properties and Processing of Chemical Vapor Deposited Zinc Sulfide," Dissertation submitted to Faculty of Dept. of Materials Sciences and Engineering, Univ. of Arizona (2008).

A.I. Ryskin et al., "Excitons in ZnS Crystals with Stacking Faults," Phys. Stat. Sol. (b), 49, pp. 875-884 (1972).

S.D. Scott et al., "Sphalerite-wurtzite Equilibria and Stoichiometry," Geochimica et Cosmochimica Acta, vol. 36, pp. 1275-1295 (1972).

Chen et al., "Characterization of Pore Size Distribution by Infrared Scattering in Highly Dense ZnS" J. Am. Ceram. Soc., vol. 76, No. 8, 1995, pp. 2086-2092.

Xue et al. "Superplastic Deformation of Zinc Sulfide Near Its Transformation Temperature," J. Am. Ceram. Soc., vol. 72, No. 10, pp. 1792-1796 (1989).

Machine translation of WO2005062394A1 published Jul. 7, 2005 to Koinuma Hideomi of NEC Corp.

Abstract machine translation of JP8271701A published Oct. 18, 1996 to Nakayama Shigeru of Sumitomo Electric Industries.

Abstract machine translation of JP5310467A issued Nov. 22, 1993 to Kobayashi Katsumichi of Dowa Mining Co.

Abstract machine translation of JP61205659A issued Sep. 11, 1986 to Sato Kazutami of Japan Tech Res & Dev Inst.

Machine translation of JP2010237029A issued Oct. 21, 2010 to Hashiba Natsuki of Seiko NPC Corp.

Machine translation of JP2008195593A issued Aug. 28, 2008 to Yoshimura Masashi of Sumitomo Electric Industries.

Machine translation of JP2008127236A issued Jun. 5, 2008 to Sato Takeshi of Sumitomo Electric Industries.

Translation of Office Action in corresponding Japan Appl. No. 2015-507089 dated Jun. 5, 2017.

W.W. Chen et al., "Experimental and Theoretical Studies of Second-Phase Scattering in IR Transmitting ZnS-based Window," Dept. of Materials Sciences and Engineering, Univ. of California.

B. Dunn et al., "Precipitation Hardening of Infrared Transmitting ZnS Ceramics", Final Report, Contract No. N00014-87-K-0531, Dept. of Materials Sciences and Engineering, Univ. of Califomia (Jun. 6, 1991).

A.G. Every et al., "The Effect of Microstructure on the Thermal Conductivity of Particulate ZnS/Diamond Composites", Office of Naval Research, Technical Report No. 12, Contract No. N00014-87-K-0527, Dept. of Materials Sciences and EnQineerinQ, Cornell Univ. (Jan. 17, 1991).

PCT International Preliminary Report on Patentability and Written Opinion of the International Searching Authority. International Application No. PCT/US2013/036618. International Filing Date: Apr. 15, 2013. Publication Noo. WO 2014/011295, dated Oct. 21, 2014.

(56) References Cited

OTHER PUBLICATIONS

D.C. Harris, "Erosion Characteristics and Optical Properties of State-of-the-Art, Erosion-Resistant Coatings on Infrared Windows: Boron Phosphide, Gallium Phosphide, and Zinc Sulfide on Multispectral Zinc Sulfide", Naval Air Warfare Center Weapons Division, China Lake, CA, May 1996, pp. 1-62.

D.C. Harris et al., "Multi-Spectral Transparent Materials Technologies", American Ceramic Society—Baltimore, Jun. 2010 pp. 1-41.

M. Isshiki et al., "Bulk Crystal Growth of Wide-Bandgap II-VI Materials", Bulk Crystal Growth of Electronic, Optical & Optoelectronic Materials (2005) pp. 270-297.

H.P. Kirchner et al., "Contact Damage in Hot-Pressed and Chemically-Vapor-Deposited Zinc Sulfide", Communications of the American Ceramic Society (Sep. 1984) pp. C-188-C-190.

P. Klocek, "Window and Dome Technologies and Materials," SPIE, vol. 1326, pp. 93-98 (1990).

J.S. McCloy et al., "Effects of Temperature, Pressure, and Metal Promoter on the Recrystallized Structure and Optical Transmission of Chemical Vapor Deposited Zinc Sulfide", J. Am. Ceram. Soc., vol. 92, No. 8 (2009) pp. 1725-1731.

H.J. McQueen et al., "Sintering of Zinc Sulfide", Journal of The American Ceramic Society, vol. 45, No. 7 (Jul. 1962) pp. 343-346.

P.L. Yoder et al., "Fractographic Analysis of CVD ZnS", Office of Naval Research, Technical Report dated Jul. 11, 1988, Contract No. N00014-87-K-0191, Penn State Univ., pp. 1-21.

J. Zhang et al., "Measurement of the Fracture Toughness of CVD-Grown ZnS Using a Miniaturized Disk-Bend Test," Dept. of Materials Sciences and Engineering, Univ. of California (Nov. 1990).

J. Zhang et al., "Solid-State Phase Equilibria in the ZnS—Ga2S3 System," J. of Amer. Chem. Soc., vol. 73, No. 6, pp. 1544-1547 (1990).

International Search Report dated Jan. 21, 2014 issued in corresponding PCT/US2013/036618 application (pp. 1-14).

\* cited by examiner

POLYCRYSTALLINE CHALCOGENIDE CERAMIC MATERIAL

This application is a divisional of application Ser. No. 14/958,360, filed Dec. 3, 2015 (now U.S. Pat. No. 10,246,377), which is a divisional of Ser. No. 13/447,921, filed Apr. 16, 2012.

SUMMARY OF THE INVENTION

The invention relates to polycrystalline materials that transmit light within the infrared spectrum, for example, the 0.7-14 µm wavelength range, such as the near-infrared range of 0.7 to 1.0 µm, the medium-wave infrared range (MWIR) of 3 to 5 µm, or the long-wave infrared (LWIR) range of 8 to 14 µm. Such materials are used for infrared window, dome and lens applications. The invention also relates to a unique process for manufacturing polycrystalline ZnS ceramic materials.

Infrared sensors are used in civilian and military applications. For example, infrared sensors can be used in the guidance systems of heat-seeking missiles, or can be used for detecting any object that emits infrared radiation. To protect these fragile and sensitive devices, IR sensors are typically positioned behind structures referred to as infrared windows or domes. For example, external IR windows or domes are used in satellites, missiles, aircrafts, and other similar devices. These IR windows provide two general functions. First, the IR window must, of course, be able to transmit infrared light to the IR sensor(s). In addition, the IR window must be able protect the sensors from the external environment.

As described by Propst et al. (U.S. Pat. No. 5,425,983) for in flight vehicles, such as missiles and aircraft, it is common for IR sensors to be mounted in the nose or belly of the missile or aircraft and thus face forward in the direction of the flight path so as to have an unobstructed view in the forward direction. As a result, the IR window or dome materials protecting the IR sensors are subject to damage, degradation or erosion, due to particles such as rain and dust, especially when the missile or aircraft is travelling at high speeds and/or over desert regions. This can lead to reduction in the strength of the window material, reduction in the window's ability to transmit infrared light, or even failure of the window material itself.

The infrared windows are made from materials that are transparent in, for example, the 2-12 µm or 8-14 µm wavelength range. That is they transmit a significant proportion of the incident infrared light within, e.g., at least 50%. To achieve this level of transmission, common materials used for infrared windows or domes are sapphire, germanium, silicon, magnesium fluoride, gallium phosphide, and chalcogenide materials (II-VI materials) such as zinc sulfide, zinc selenide, zinc telluride, and cadmium telluride.

While these materials exhibit sufficient transmission within at least a portion of the infrared spectrum, their strength is not always sufficient for certain applications. As an infrared window material, sapphire is quite strong. However, sapphire's ability to transmit mid-range infrared light decreases at a wavelength of 5 microns and is opaque to infrared light with a wavelength of 6 microns and greater. In addition, sapphire is difficult to machine and thus may be unsuitable for application requiring specific curvatures, such as IR domes used to protect sensors in the noses of guided missiles.

Other materials such as zinc sulfide, zinc selenide, germanium, and gallium arsenide maintain a good level of transmission in the infrared spectrum, even at larger thicknesses. However, the strength of these materials is not sufficient in many cases to resist erosion and degradation that IR windows are exposed to in certain applications, such as exposure to rain and dust particles in high speed missiles and aircraft.

Using zinc sulfide in the production of infrared windows has been known for many years. Initially, zinc sulfide IR windows were made by a hot-pressing process. See, for example, Carnall et al. (U.S. Pat. Nos. 3,131,025 and 3,131,238) who describe a process for producing optical elements made of polycrystalline by placing zinc sulfide powder in a mold which is then subjected to a vacuum. The zinc sulfide is heated to an elevated temperature of 1420° F.-1770° F. (e.g., 1550° F.) and then by means of a hydraulic press the zinc sulfide is subjected to a pressure of 20,000-40,000 psi for 5-35 minutes while maintaining the elevated temperature. Carnall et al. (U.S. Pat. No. 3,131,026), Roy et al. (U.S. Pat. No. 3,454,685), and Martin et al. (U.S. Pat. No. 4,366,141) also describe materials and processes for hot-pressing zinc sulfide powder.

However, there was a desire to provide larger sized ZnS materials with better optical properties. As a result, chemical vapor deposition (CVD) processes for manufacturing ZnS windows were developed. In the CVD process, vaporized zinc solids are reacted with hydrogen sulfide in a high-temperature vacuum furnace. Teverovsky et al. (U.S. Pat. No. 5,383,969), for example, disclose processes and apparatus for CVD production of ZnS. However, there is still a need to provide infrared optical materials that exhibit both sufficient optical properties within the infrared spectrum, as well as improved mechanical properties, such as high hardness, in order to withstand the harsh conditions to which IR windows and domes are exposed.

Therefore, an aspect of the invention is to provide polycrystalline ceramic compositions that exhibit good optical transmission properties within the 0.7-14 µm wavelength range, for example within the 1-10 µm or 8 to 12 µm wavelength range. Another aspect of the invention is the use of such materials for infrared window, dome and lens applications. A further aspect of the invention is a unique process for manufacturing the inventive polycrystalline ceramic materials.

Upon further study of the specification and appended claims, further aspects and advantages of this invention will become apparent to those skilled in the art.

Therefore, in accordance with the invention, there is provided a sintered polycrystalline ceramic body comprising a chalcogenide material in a polymorphic form having a cubic structure, for example, zinc sulfide sphalerite, and having an extinction coefficient of $\leq 2.75$ cm$^{-1}$ at a wavelength of 1100 nm and a Vickers hardness of $\geq 180$ kg/mm$^2$.

In accordance with the invention, the polycrystalline ceramic material can be selected from any chalcogenide material that exhibits a polymorphic form having a cubic structure, such as zinc sulfide, zinc selenide, zinc telluride, or cadmium telluride. Preferably, the polycrystalline ceramic material is zinc sulfide composed primarily, if not entirely or substantially entirely, of a sphalerite (cubic) crystalline structure.

The polycrystalline ceramic materials (preferably ZnS) in accordance with the invention transmit light within the infrared spectrum. For example, the polycrystalline ZnS ceramic materials, at a thickness of 6 mm, preferably transmit at least 40% of incident infrared light within, for example, the 0.7-3 µm wavelength range, the 3.0-8.0 µm wavelength range and/or the 8.0-12.0 µm wavelength range, particularly at least 50% of incident infrared light, especially at least 60% of incident infrared light, and most preferably at least 70% of incident infrared light.

According to an aspect of the invention, the polycrystalline ZnS ceramic materials preferably have an extinction coefficient of ≤2.75 cm$^{-1}$ (for example, 0.2-2.5 cm$^{-1}$ or 0.2-1.0 cm$^{-1}$) at a wavelength of 1100 nm, particularly ≤2.0 cm$^{-1}$, especially ≤1.5 cm$^{-1}$, and most preferably ≤0.5 cm$^{-1}$, for example, 0.2 cm$^{-1}$, 0.1 cm$^{-1}$, or even 0.05 cm$^{-1}$.

The polycrystalline ZnS ceramic materials in accordance with the invention also exhibit advantageous physical properties. In terms of hardness, the inventive polycrystalline ZnS materials exhibit high Vickers and Knoop hardness values. For example, the inventive polycrystalline ZnS materials preferably have a Vickers hardness of ≥180 kg/mm$^2$ (for example 180-265 kg/mm$^2$), particularly ≥200 kg/mm$^2$, very particularly ≥210 kg/mm$^2$, especially ≥230 kg/mm$^2$, and most preferably ≥250 kg/mm$^2$.

Similarly, the inventive polycrystalline ZnS materials preferably have a Knoop Indentation hardness, measured at a force of 0.1N, of at least ≥180 kg/mm$^2$ (for example 180-265 kg/mm$^2$), especially ≥200 kg/mm$^2$, particularly ≥225 kg/mm$^2$, very particularly ≥250 kg/mm$^2$, and most particularly ≥260 kg/mm$^2$.

In most common applications, ZnS materials are used for multispectral applications, wherein the material transmits within a broad portion within the 0.7-14 μm wavelength range, and FLIR (Forward Looking Infrared) applications wherein the material transmits within in the 8-12 μm wavelength range.

For multispectral applications, the commercially available ZnS materials typically exhibit an extinction coefficient of about 0.05 cm$^{-1}$ (at 1100 nm) with a Vickers Hardness of about 147 kg/mm$^2$. For FLIR applications, the commercially available ZnS materials typically exhibit an extinction coefficient of about 3.6 cm$^{-1}$ (at 1100 nm) with a Vickers Hardness of about 230 kg/mm$^2$.

In accordance with a further aspect of the invention, the inventive polycrystalline ZnS materials are suitable for multispectral applications and preferably exhibit an extinction coefficient of ≤1.5 cm$^{-1}$ (at 1100 nm) with a Vickers Hardness of at least 200 kg/mm$^2$, particularly an extinction coefficient of ≤1.0 cm$^{-1}$ (at 1100 nm) with a Vickers Hardness of at least 200 kg/mm$^2$, especially an extinction coefficient of ≤0.5 cm$^{-1}$ (at 1100 nm) with a Vickers Hardness of at least 200 kg/mm$^2$, and most preferably an extinction coefficient of ≤0.2 cm$^{-1}$ (at 1100 nm) with a Vickers Hardness of at least 220 kg/mm$^2$.

In accordance with a further aspect of the invention, the inventive polycrystalline ZnS materials are suitable for FLIR applications and exhibit an extinction coefficient of preferably ≤2.5 cm$^{-1}$ (at 1100 nm), particularly ≤2.0 cm$^{-1}$ (at 1100 nm), especially ≤1.5 cm$^{-1}$ (at 1100 nm), and most preferably ≤1.0 cm$^{-1}$ (at 1100 nm). In addition, the materials preferably exhibit a Vickers Hardness of at least 210 kg/mm$^2$, particularly at least 220 kg/mm$^2$, especially least 240 kg/mm$^2$, and most preferably at least 250 kg/mm$^2$.

As for other physical properties, the ZnS materials according to the invention preferably have a thermal coefficient of expansion for the multispectral applications of at least 6.0×10$^{-6}$/K, especially at least about 6.5×10$^{-6}$/K, and a thermal coefficient of expansion for the FLIR applications of at least 6.0×10$^{-6}$/K, especially at least about 6.8×10$^{-6}$/K. Additionally, the ZnS materials according to the invention preferably have a thermal conductivity for the multispectral applications of at most 0.3 watts/cm °C., especially at most about 0.27 watts/cm °C., and a thermal conductivity for the FLIR applications of at most 0.2 watts/cm °C., especially at least most about 0.167 watts/cm °C.

In terms of physical structure the ZnS materials according to the invention preferably consist essentially of ZnS in its cubic sphalerite polymorphic form. In particular, it is desirable to limit formation of the other main polymorphic form of ZnS, i.e., the hexagonal wurtzite crystalline form. Wurzite crystals adversely affect both the optical and mechanical properties of the ZnS materials. The presence of wurtzite causes scattering at shorter wavelengths due to the refractive index mismatch between the two phases. Preferably, the percentage of wurtzite crystals is less than 1 vol. %, particularly less than 0.1 vol. %, especially less than 0.05 vol. %.

Also with regards to physical structure, the ZnS materials according to the invention preferably consist essentially of ZnS in its cubic sphalerite polymorphic form with an average grain size of preferably less than 8 μm, especially less than 6 μm, particularly less than 5 μm, and most preferably less than 3 μm.

The low grain size is desirable for increasing the strength of the material. Grain size is linked to strength based on the well-known Hall-Petch relationship, $\sigma_y = \sigma_0 + kd^{-1/2}$, where $\sigma_y$ is yield stress, $\sigma_0$ is the intrinsic yield stress, k is a constant for a given material, and d is grain size. Thus, as grain size decreases (down to grain sizes of about 10 nm) the strength in terms of yield stress increases.

Additionally, it is preferred that the ZnS materials according to the invention have a low porosity, as well as a low average pore size. As porosity increases, the transmission quality tends to decrease. Similarly, as average pore size increases, transmission quality tends to decrease. Therefore, the ZnS materials according to the invention preferably have an average pore radius of less than about 0.10 microns, especially less than 0.07 microns, particularly less than 0.05 microns.

To achieve the desired optical and mechanical properties, the polycrystalline ZnS ceramic materials in accordance with the invention are prepared by a unique process that combines sintering and uniaxial pressing with hot isostatic pressing. Thus, in accordance with a method aspect of the invention, a ZnS powder is initially subjected to a sintering and uniaxial pressing wherein the powder is heated to a temperature of preferably about 900-1000° C. (for example, at a rate of preferably about 1.5 to 12 K/min). Then, the material is subjected to a uniaxial pressing at a pressure of preferably about 40 to 60 MPa for a time period of preferably about 0.16-6 hours. Thereafter, the resultant pressed material is subjected to hot isostatic pressing at a temperature of, for example, 880-1000° C., preferably about 900-1000° C., especially about 925-975° C. under an inert gas pressure of preferably about 200-210 MPa for a time period of preferably about 10 to 100 hours.

Thus, according to another aspect of the invention there is provided a process for preparing a polycrystalline chalcogenide ceramic material, preferably a polycrystalline ZnS ceramic material, comprising:

heating a chalcogenide powder to a temperature of 900-1000° C., subjecting the heated powder to uniaxial pressing at a pressure of 40 to 60 MPa and a temperature of 900-1000° C. for 0.16-6 hours, and subjecting the resultant pressed chalcogenide material to hot isostatic pressing at a temperature of 880-1000° C., preferably 900-1000° C., especially 925-975° C. under an inert gas pressure of 180-250 MPa for 10 to 100 hours.

The particle size of the starting material, e.g., the ZnS powder, is preferably within the range of ≥400 nm to 10 µm. By using a powder with a particle size fine enough to improve sintering behavior but coarse enough to prevent a lowering of the wurtzite-sphalerite transition temperature, a highly transparent material with improved strength is created without degrading the optical properties. Preferably, the ZnS powder is made up of particles wherein less than 10 wt. % of the particles have a diameter of 500 nm or less, less than 50 wt. % of the particles have a diameter of 5 µm or less, and less than 90 wt. % of the particles have a diameter of 10 µm or less.

The sintering temperature is kept well below the sublimation point of ZnS (~1185° C.) and preferably below the transition temperature at which the sphalerite form converts to the wurtzite form (~1020 C). Xue and Raj describe thermally induced plasticity seen in zinc sulfide (Xue, L. A., & Raj, R. (1989). Superplastic Deformation of Zinc Sulfide Near Its Transformation Temperature. *J. Am. Ceram. Soc.,* 72 [10], 1792-1796). The sinter forging process (i.e., the combined sintering and uniaxial pressing) causes the crystals to deform through a twinning mechanism. This highly twinned microstructure created during this process inhibits grain growth during subsequent processing, e.g., during hot isostatic pressing.

After the sintering and uniaxial pressing, the ZnS material is subjected to hot isostatic pressing (HIP). In the hot isostatic pressing, the material is subjected to elevated temperature and elevated isostatic gas pressure (i.e., gas pressure applied from all sides). In accordance with the invention, hot isostatic pressing of the uniaxially pressed material is performed at a temperature of preferably 925-975° C. under an inert gas (typically argon) pressure of preferably 200-210 MPa. A high degree of transparency is achieved during hot pressing by applying pressure after the part has reached the desired temperature. This allows some degree of plastic deformation and prevents rapid grain growth which can entrap porosity. Thus, one function of the hot isostatic pressing is to reduce residual porosity by reducing the number and average radius of the pores. The hot isostatic pressing is performed for a time period of preferably 10 to 100 hours, for example 12 to 20 hours.

According to another aspect of the invention, after being placed in the mold of a hot press assembly, the ZnS powdered sample is initially subjected to a vacuum in order to remove trapped gasses and contaminants from the sample. The vacuum is preferably within the range of $10^{-4}$ to $10^{-2}$ torr.

In addition, prior to sintering, the ZnS powdered sample can be subjected to one or more low temperature burnout steps to eliminate entrapped hydrocarbons that may be adsorbed to the surface. The presence of such hydrocarbons can cause absorption within important areas of the IR spectrum thereby reducing the transmission efficiency of the resultant material. These burnout steps are preferably performed under vacuum (e.g., $10^{-3}$ to $10^{-2}$ torr) at temperatures of 50-300° C. For example, the ZnS powdered sample can be heated to 50° C., 150° C., and then 200° C., and held at each of these temperatures until a desired vacuum level is reached (for example, a vacuum of $10 \times 10^{-3}$ torr).

After the hot isostatic pressing is completed, the material is cooled to room temperature and can then be subjected to polishing in accordance with conventional practice.

The resultant materials can be used in typical applications for infrared window, dome and lens applications.

Thus, according to another aspect of the invention, there is provided an infrared window or dome for protecting an infrared sensor, wherein the infrared window or dome comprises the inventive polycrystalline ZnS ceramic material, preferably a polycrystalline ZnS ceramic material having an extinction coefficient of ≤2.75 $cm^{-1}$ at a wavelength of 1100 nm and a Vickers hardness of ≥180 $kg/mm^2$ (for example, 0.25-2.75 $cm^{-1}$ at a wavelength of 1100 nm and 180-265 $kg/mm^2$).

According to another aspect of the invention, there is provided an infrared imaging system comprising at least one infrared sensor and an infrared window or dome for protecting the at least one infrared sensor from the external environment, wherein the infrared window or dome comprises the inventive polycrystalline ZnS ceramic material, preferably a polycrystalline ZnS ceramic material having an extinction coefficient of ≤2.75 $cm^{-1}$ at a wavelength of 1100 nm and a Vickers hardness of ≥180 $kg/mm^2$ (for example, 0.05-0.2 $cm^{-1}$ at a wavelength of 1100 nm and 180-265 $kg/mm^2$).

According to another aspect of the invention, there is provided an infrared lens for focusing light within the 0.7-14 µm wavelength range, wherein the infrared lens comprises inventive polycrystalline ZnS ceramic material, preferably a polycrystalline ZnS ceramic materials having an extinction coefficient of ≤2.75 $cm^{-1}$ at a wavelength of 1100 nm and a Vickers hardness of ≥180 $kg/mm^2$ (for example, 0.05-0.2 $cm^{-1}$ at a wavelength of 1100 nm and 180-265 $kg/mm^2$).

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 illustrates a hot press mold fabricated of, for example, fine grained isopressed graphite. The mold comprises mold member 1 fashioned as a solid cylinder, mold members 2 and 4 fashioned as hollow cylinders, mold member 3 fashioned as a hollow cylinder with a slit cut down the long axis, and mold member 5 fashioned as a cylinder. Additionally, a first intermediate disk 8 and a second intermediate disk 11 both fabricated from fine grained isopressed graphite are provided.

Figure 1:
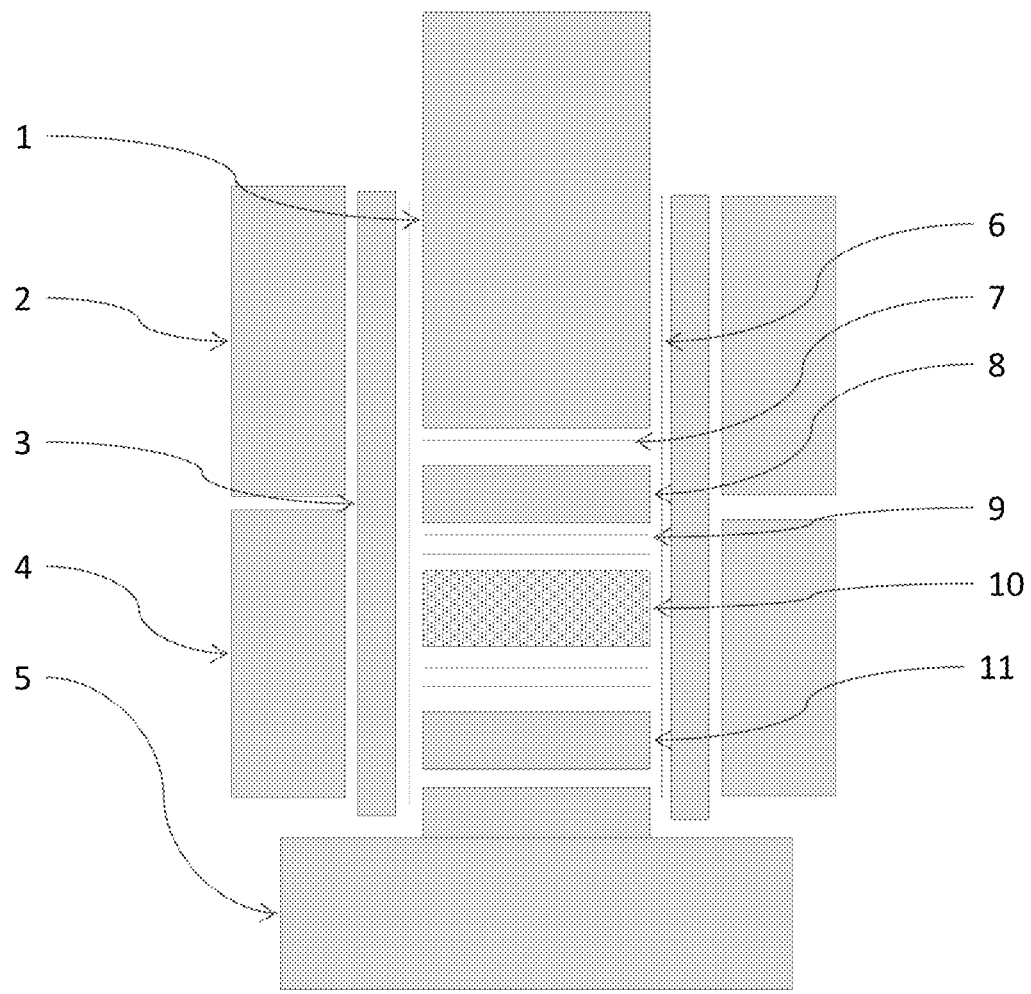
FIG. 1 illustrates hot press die mold for use in the manufacture of polycrystalline ZnS ceramic compositions in accordance with the invention.

Powdered ZnS having an average particle size of 5 µm, in the form of a green compact 10, is positioned between the first intermediate disk 8 and the second intermediate disk 11. The surfaces of the intermediate disks 8 and 11 facing toward the green compact 10 and the inside wall of the hollow cylinder 3 form the surfaces of the mold cavity. These surfaces are covered with a sheet of graphite foil 6, 7, 9 having a thickness of about 0.010 inches.

The mold is placed completely into a hot press assembly. The assembly is initially evacuated to a pressure $50 \times 10^{-3}$ torr, and then subjected to a burnout cycle to remove adsorbed gasses from the ceramic powder. The powdered sample is heated to 50, 150, 200° C. and held at each temperature until a desired vacuum level is reached (for example, 200° C. and 10×10$^{-3}$ torr, respectively). The assembly is then heated, without applying pressure, to a temperature between 900° C. and 1000° C., preferably around 950° C. After reaching the desired temperature, at a rate of 7 tons per minute pressure is applied to mold member 1 until a pressure of between 40 and 60 MPa, preferably around 55 MPa, is obtained. The pressure is then held at this level for a time of, for example, 0.16 to 6 hours, e.g., 2-4 hours. The pressed article can then be subsequently removed from the mold without damage by removing mold member 5 and pressing the contents out into a hollow cavity with a depth equal the sum of the thicknesses of intermediate disks 8 and 11.

The part is the placed in a graphite crucible and hot isostatically pressed under argon at a pressure of 180-230 MPa at a temperature of 900° C.-1000° C., e.g., 950° C., for a period between 6 and 100 hours, e.g. 12 hours.

Figure 2:
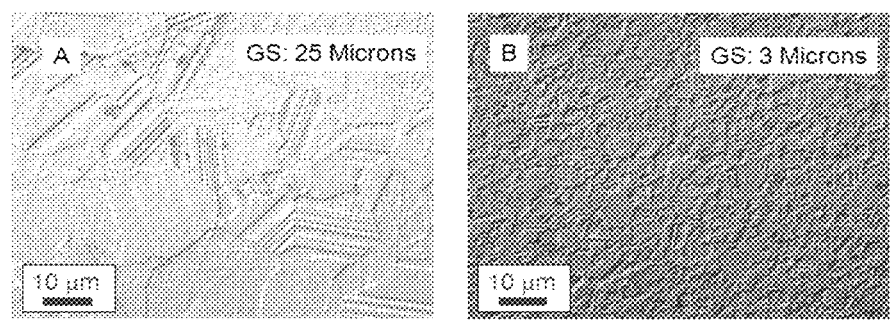
FIG. 2 illustrates the fine microstructure achieved by the invention in comparison with the microstructures achieved by standard hot pressing processes.

FIG. 2A shows the microstructure of a ZnS ceramic body produced by a standard hot pressing process using ZnS produced by chemical vapor deposition as the starting material. As shown, the microstructure is very coarse (e.g., average grain size of 25 μm) and the material had a Vickers Hardness of 150 kg/mm$^2$. FIG. 2B shows the microstructure of a ZnS ceramic body produced in accordance with the inventive process. The microstructure is very fine (e.g., average grain size of 3 μm) and the material had a Vickers Hardness of 200 kg/mm$^2$.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Tables 1 and 2 describe the preparation examples of the ZnS compositions in accordance with the invention, and the properties of the resultant materials.

TABLE 1

Preparation Examples of ZnS Ceramic Compositions According to the Invention

| Example No. | Burn-out cycle | Heat Rate (° C./min) | Sintering Temp. (° C.) | Uniaxial Pressing (kpsi) | Uniaxial Pressing Hold Time (hrs) | HIP Temp. (° C.) | HIP Time (hrs) |
|---|---|---|---|---|---|---|---|
| 1 | 0 | 6 | 950 | 6.5 | 4 | 950 | 6 |
| 2 | 0 | 6 | 950 | 6.5 | 4 | 950 | 6 |
| 3 | 0 | 2 | 950 | 8 | 0.16 | 950 | 12 |
| 4 | 0 | 10 | 950 | 8 | 2 | 950 | 12 |
| 5 | 0 | 10 | 950 | 8 | 6 | 950 | 12 |
| 6 | 0 | 10 | 950 | 5 | 6 | 950 | 12 |
| 7 | 1 | 2 | 900 | 8 | 2 | 950 | 12 |
| 8 | 1 | 2 | 950 | 8 | 4 | 950 | 12 |

Examples 1-6 were using a die with a radius of 25 cm, whereas Examples 7-8 were using a die with a radius of 127 cm.

TABLE 2

Properties of ZnS Ceramic Compositions According to the Invention

| Example | Extinction Coefficient at 1100 nm (cm$^{-1}$) | Knoop Hardness (kg/mm$^2$) | Grain Size (μm) |
|---|---|---|---|
| 1 | 2.1 | 190 | 2.09 |
| 2 | 1.8 | 196 | 3.73 |
| 3 | 2.0 | 212 | 4.32 |
| 4 | 1.8 | 230 | 3.15 |
| 5 | 2.4 | 227 | 3.19 |
| 6 | 2.3 | 216 | 4.18 |
| 7 | 0.2 | 257 | <3 |
| 8 | 0.5 | 250 | <3 |
| ZnS MultiSpectral® | 0.05-0.2 | 150-165 | 20-100 |
| CLEARTRAN® | 0.05-0.2 | 147 | 20-100 |
| ZnS FLIR material[1] | 3.60 | 210-240 | 2-8 |

ZnS MultiSpectral® is a ZnS material from II-VI Infrared which is made by chemical vapor deposition and is modified by a hot isostatic press (HIP) process. The material exhibits transmission in the 0.4 to 12 micron range.

CLEARTRAN® is a ZnS material from DOW which is made by chemical vapor deposition and is modified by a hot isostatic process. The material exhibits transmission in the 0.35-14 μm range.

[1] ZnS from II-VI Infrared produced by chemical vapor deposition (CVD). The material is used in the 8 to 12 micron region.

Figure 3:
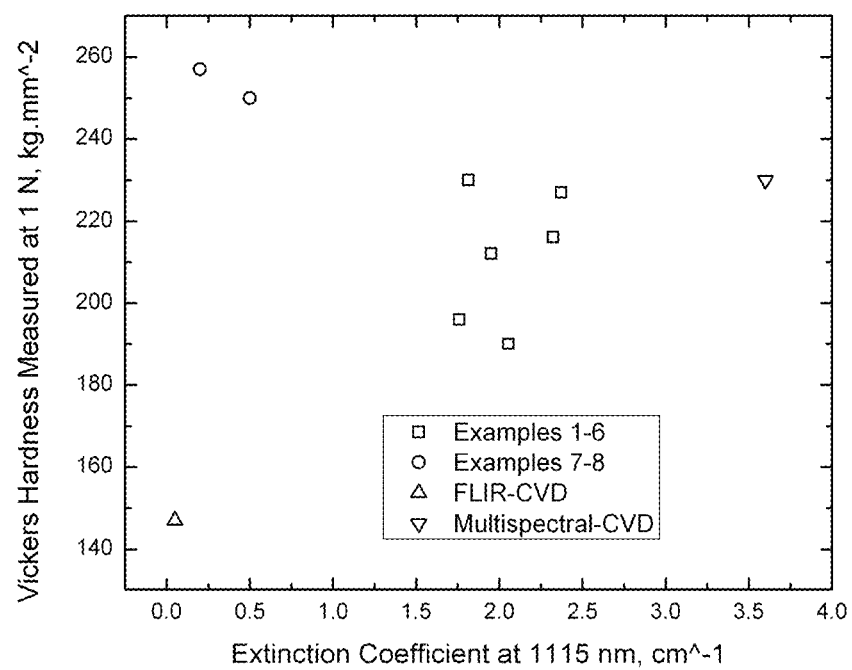
FIG. 3 is a table showing the Vickers Hardness of examples in accordance with the invention as a function of extinction coefficient at 1100 nm.

FIG. 3 is a table showing the Vickers Hardness as a function of extinction coefficient at 1100 nm for Examples 1-7 in accordance with the invention, as well as for a commercial available ZnS ceramic used for FLIR applications and commercial available ZnS ceramic used for multispectral applications.

Figure 4:
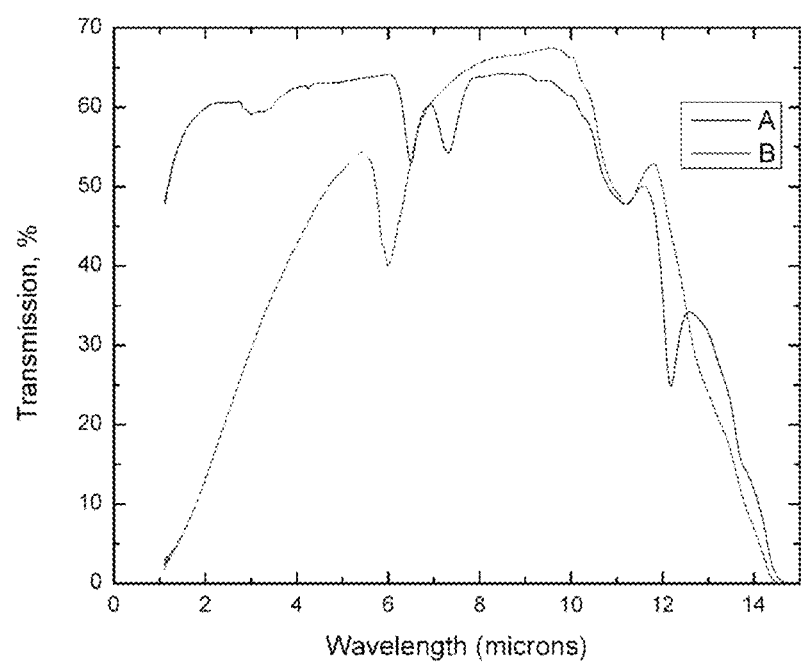
FIG. 4 graphically illustrates a comparison of the transmission spectrum for Example 7 in accordance with the invention and the transmission spectrum for a commercially available FLIR (Forward Looking Infrared) material.

FIG. 4 illustrates the in-line infrared transmittance for Example 7 in the wavelength range from 1 to 14 microns (Line B) measured using a Perkin-Elmer Lambda 900 spectrophotometer. The sample used had a thickness of 6.3 mm Line A in FIG. 4 shows the in-line infrared transmittance for a typical commercially available FLIR grade ZnS material. Here, the in-line transmittance represents the ratio of intensity of the transmitted portion of incident light to the intensity of the incident light.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure{s} of all applications, patents and publications, cited herein, are incorporated by reference herein.

The invention claimed is:

1. A sintered polycrystalline ceramic body comprising ZnS in a polymorphic form having a cubic structure and having the transmittance of at least 50% in a wavelength range of 0.7-12 μm for a 6 mm thickness, and a Vickers hardness of ≥180 kg/mm$^2$.

2. A sintered polycrystalline ceramic body of claim 1, wherein said chalcogenide material is zinc sulfide sphalerite.

3. A sintered polycrystalline ceramic body of claim 1, wherein said ceramic body has an average pore radius of less than 0.10 microns.

4. A sintered polycrystalline ceramic body of claim 1, wherein said ceramic body has an average grain size of less than 8 μm.

5. An infrared window or dome for protecting an infrared sensor, comprising a polycrystalline chalcogenide ceramic body of claim 1.

6. An infrared imaging system comprising at least one infrared sensor and the infrared window or dome of claim 5.

7. An infrared lens for focusing light within the 0.4-14 μm wavelength range, wherein said infrared lens comprises a polycrystalline chalcogenide ceramic body of claim 1.

8. The sintered polycrystalline ceramic body of claim 1, wherein the sintered polycrystalline ceramic body is prepared by:
heating a chalcogenide powder; and
subjecting the heated powder to uniaxial pressing.

9. The sintered polycrystalline ceramic body of claim 8, wherein less than 50 wt % of the chalcogenide powder has a diameter of 5 μm or less.

10. The sintered polycrystalline ceramic body of claim 9, further comprising the step of subjecting the pressed heated powder to hot isostatic pressing.

11. The sintered polycrystalline ceramic body of claim 8, wherein the chalcogenide powder is heated to about 900-1,000° C. and the heated powder is pressed at a pressure of about 40-60 MPa and a temperature of about 900-1,000° C. for about 0.16-6 hours.

12. The sintered polycrystalline ceramic body of claim 10, wherein the hot isostatic pressing is at a temperature of about 880-1,000° C. under an inert gas pressure of about 180-250 MPa for about 6-100 hours.

13. The sintered polycrystalline ceramic body of claim 1, wherein said body has a transmittance of at least 60% in a wavelength range of 0.7-12 μm for a 6 mm thickness.

14. The sintered polycrystalline ceramic body of claim 1, wherein said body has a transmittance of at least 70% in a wavelength range of 0.7-12 μm for a 6 mm thickness.

15. The sintered polycrystalline ceramic body of claim 1, wherein said ceramic body has an extinction coefficient of $\leq 0.5$ $cm^{-1}$ at a wavelength of 1100 nm.

16. The sintered polycrystalline ceramic body of claim 1, wherein said ceramic body has a Vickers hardness of $\geq 230$ $kg/mm^2$.

17. A sintered polycrystalline ceramic body of claim 1, wherein said ceramic body has an extinction coefficient of $\leq 0.5$ $cm^{-1}$ at a wavelength of 1100 nm and a Vickers hardness of $\geq 230$ $kg/mm^2$.

* * * * *